United States Patent
Hido et al.

(12) 
(10) Patent No.: US 11,414,034 B2
(45) Date of Patent: Aug. 16, 2022

(54) OCCUPANT PROTECTION SYSTEM

(71) Applicant: HONDA MOTOR CO., LTD., Tokyo (JP)

(72) Inventors: Nobuaki Hido, Wako (JP); Yoshihisa Sugamata, Wako (JP); Shigeo Tobaru, Wako (JP); Takashi Yanagihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/201,572

(22) Filed: Mar. 15, 2021

(65) Prior Publication Data

US 2021/0291769 A1 Sep. 23, 2021

(30) Foreign Application Priority Data

Mar. 18, 2020 (JP) .............................. JP2020-047578

(51) Int. Cl.
| B60R 21/017 | (2006.01) |
| B60R 21/13 | (2006.01) |
| B60R 21/0136 | (2006.01) |
| B60R 21/231 | (2011.01) |
| B60R 21/00 | (2006.01) |

(52) U.S. Cl.
CPC ........ B60R 21/017 (2013.01); B60R 21/0136 (2013.01); B60R 21/13 (2013.01); B60R 21/23138 (2013.01); B60R 2021/0004 (2013.01); B60R 2021/0006 (2013.01); B60R 2021/0018 (2013.01)

(58) Field of Classification Search
None
See application file for complete search history.

(56) References Cited

U.S. PATENT DOCUMENTS 10,870,390 B2 * 12/2020 Tucker ................ B60R 21/0132

FOREIGN PATENT DOCUMENTS

| JP | H0924792 A | * | 7/1995 |
| JP | H09-240417 A | | 9/1997 |
| JP | 2004284448 A | * | 10/2004 |
| JP | 2014151756 A | * | 8/2014 |
| JP | 2018099905 A | * | 6/2018 |

* cited by examiner

*Primary Examiner* — Nicole T Verley

(74) *Attorney, Agent, or Firm* — Rankin, Hill & Clark LLP

(57) ABSTRACT

An occupant protection system has a component in question reduced in size and cost. The occupant protection system includes: a rollover airbag device provided in a vehicle interior; a battery configured to supply power to the rollover airbag device; a controller configured to determine a rollover of a vehicle and, if a rollover of the vehicle is determined, activate the rollover airbag device using power supplied from the battery; and a backup power source configured to charge power to be used if the battery fails. The controller determines a collision of the vehicle and examines the battery for any failure and, if a collision of the vehicle is determined and the battery is examined to have a failure, activates the rollover airbag device using the power charged in the backup power source.

2 Claims, 5 Drawing Sheets

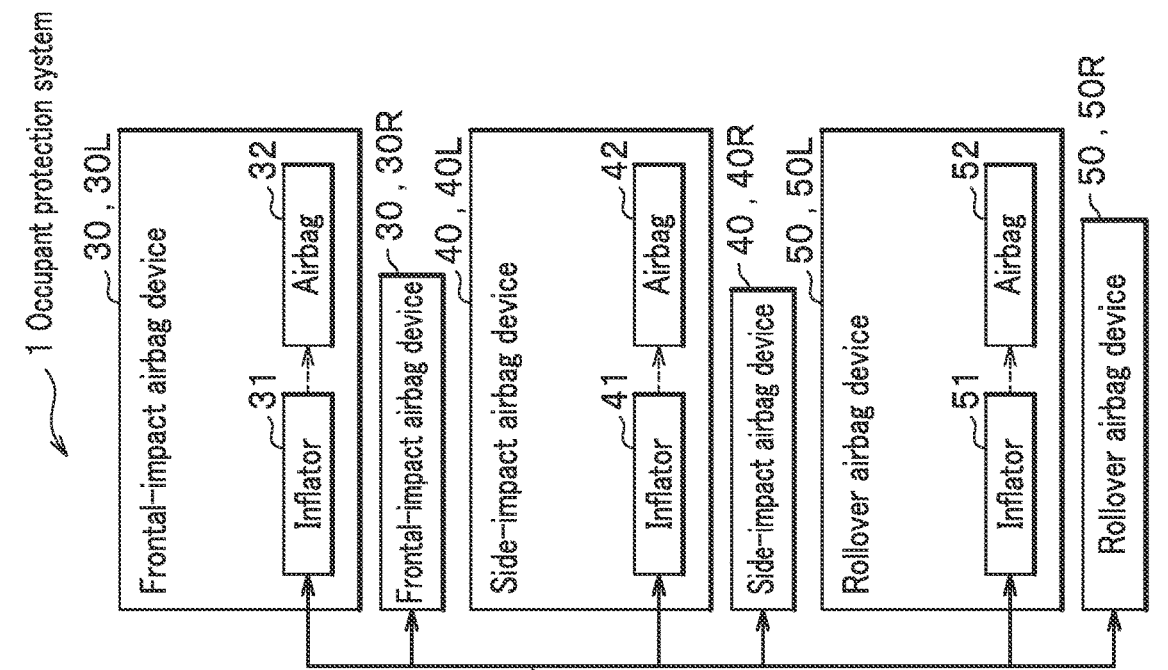
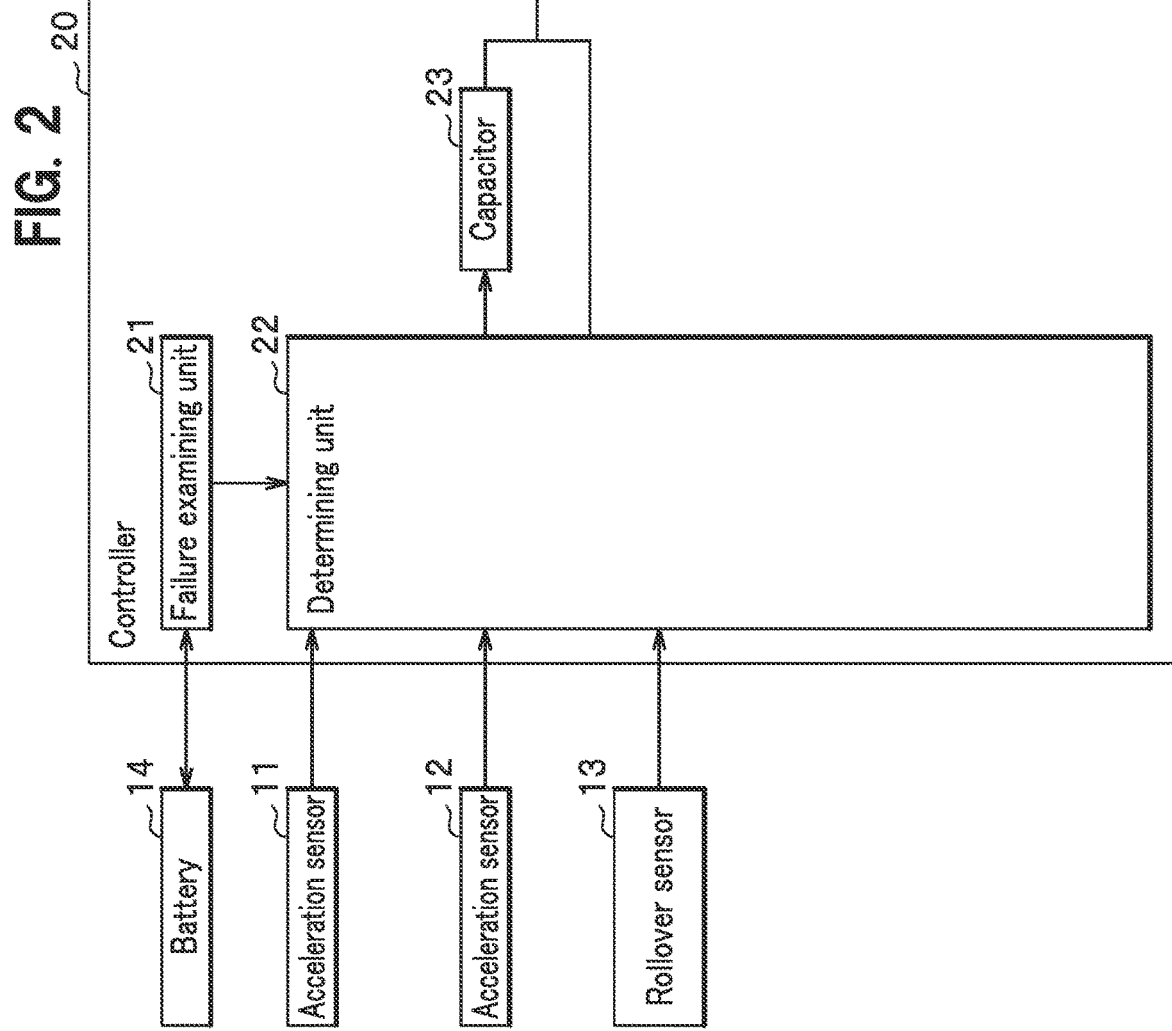
FIG. 2

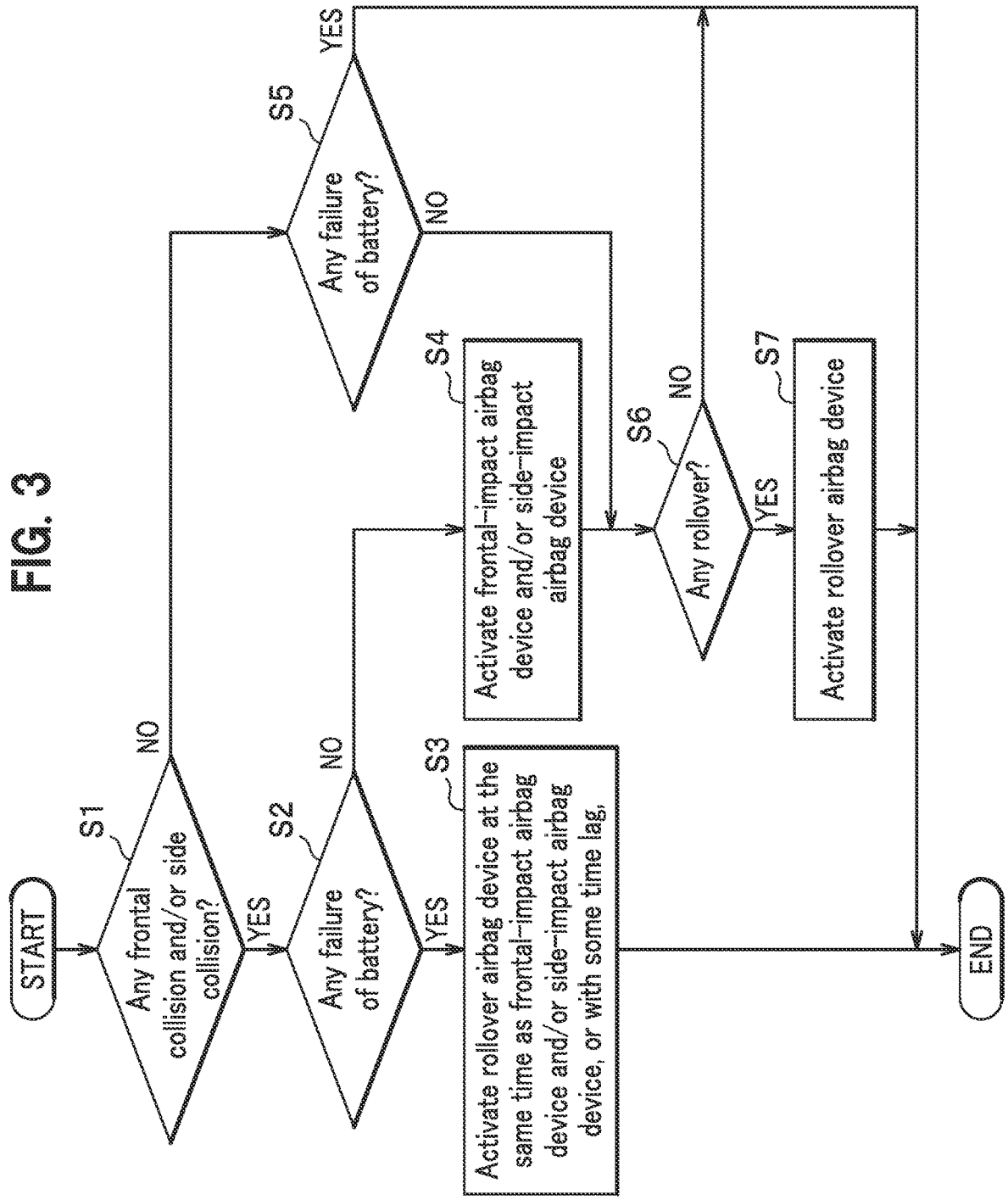

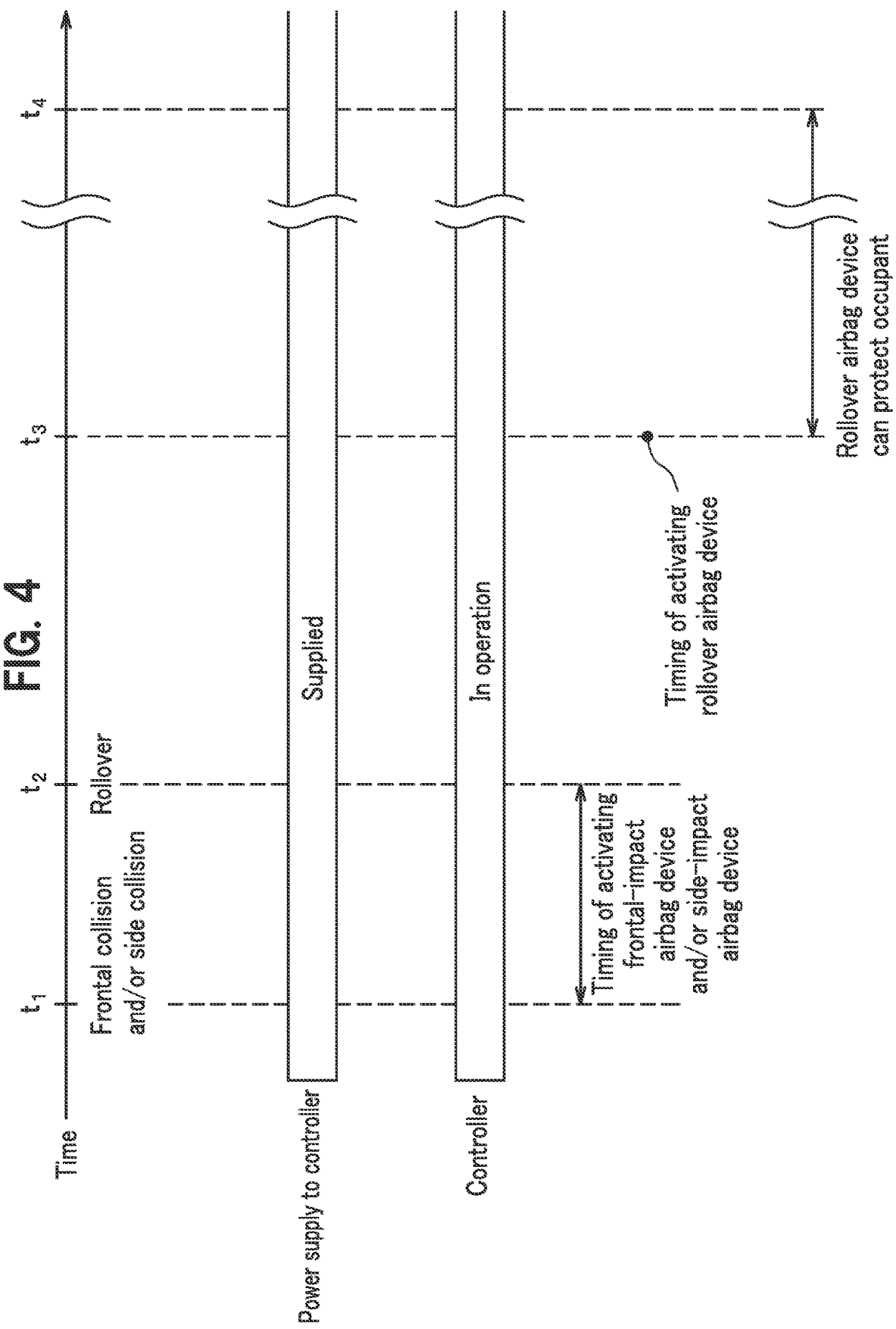

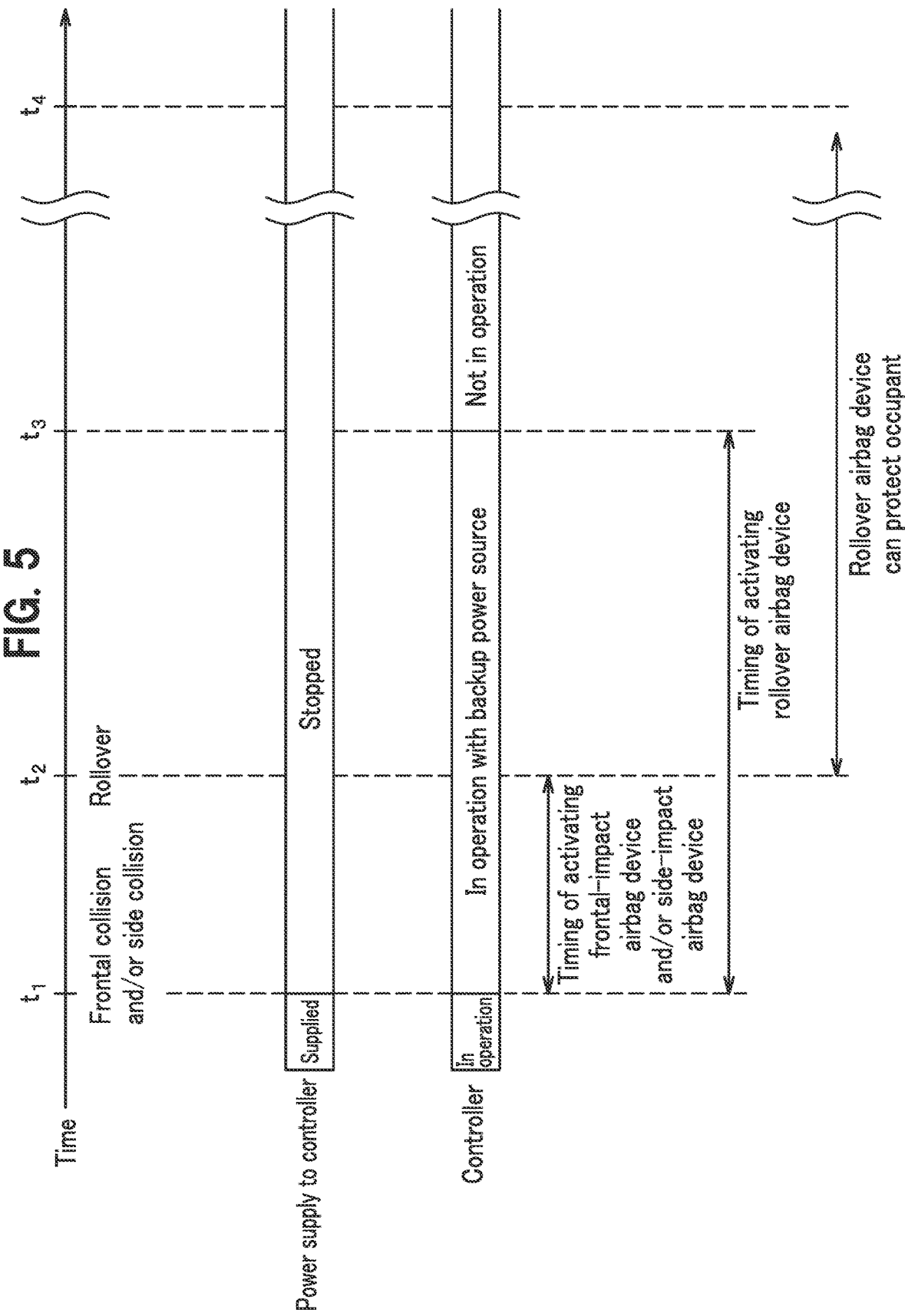

OCCUPANT PROTECTION SYSTEM

CROSS-REFERENCE TO RELATED APPLICATION

This application claims the benefit of priority to Japanese Patent Application No. 2020-047578 filed on 18 Mar. 2020, the disclosures of all of which are hereby incorporated by reference in their entireties.

TECHNICAL FIELD

The present invention relates to an occupant protection system.

BACKGROUND OF THE INVENTION

Japanese Patent Application Publication No. H09-240417 discloses a technique of providing a frontal-impact airbag and a side-impact airbag as an occupant protection device, particularly in a vehicle. The vehicle is provided with a capacitor as a backup power source for the airbags, which are activated using power charged in the capacitor if power supply from a battery of the vehicle has been stopped.

SUMMARY OF THE INVENTION

Problems to be Solved

Additionally, a vehicle may be provided with a rollover airbag. A time since a rollover has been detected until the airbag is activated is set longer for a rollover airbag than a corresponding time for a frontal-impact airbag or a side-impact airbag. This causes a capacitor as a backup power source to be increased in capacity; so that the capacitor is increased in size and cost.

The present invention has been made in view of the above-identified problems and is intended to provide an occupant protection system having a component in question reduced in size and cost.

Solution to Problem

An occupant protection system of the present invention, as a solution to the above-identified problem, includes: a rollover airbag device provided in a vehicle interior; a battery configured to supply power to the rollover airbag device; a controller configured to determine a rollover of a vehicle and, if a rollover of the vehicle is determined, activate the rollover airbag device using power supplied from the battery; and a backup power source configured to charge power to be used if the battery fails, wherein the controller determines a collision of the vehicle and examines the battery for any failure and, if a collision of the vehicle is determined and the battery is examined to have a failure, activates the rollover airbag device using the power charged in the backup power source.

Advantageous Effects of the Invention

The present invention allows a component in question, that is, a backup power source, to be reduced in size and cost.

BRIEF DESCRIPTION OF DRAWINGS

FIG. 2 is a schematic block diagram of the occupant protection system according to the embodiment of the present invention;

FIG. 3 is a flowchart of exemplary behavior of the occupant protection system according to the embodiment of the present invention;

FIG. 4 is a schematic diagram illustrating the exemplary behavior of the occupant protection system according to the embodiment of the present invention, in a case where a battery has not failed; and FIG. 5 is a schematic diagram illustrating the exemplary behavior of the occupant protection system according to the embodiment of the present invention, if the battery has failed.

EMBODIMENTS OF THE INVENTION

Figure 1:
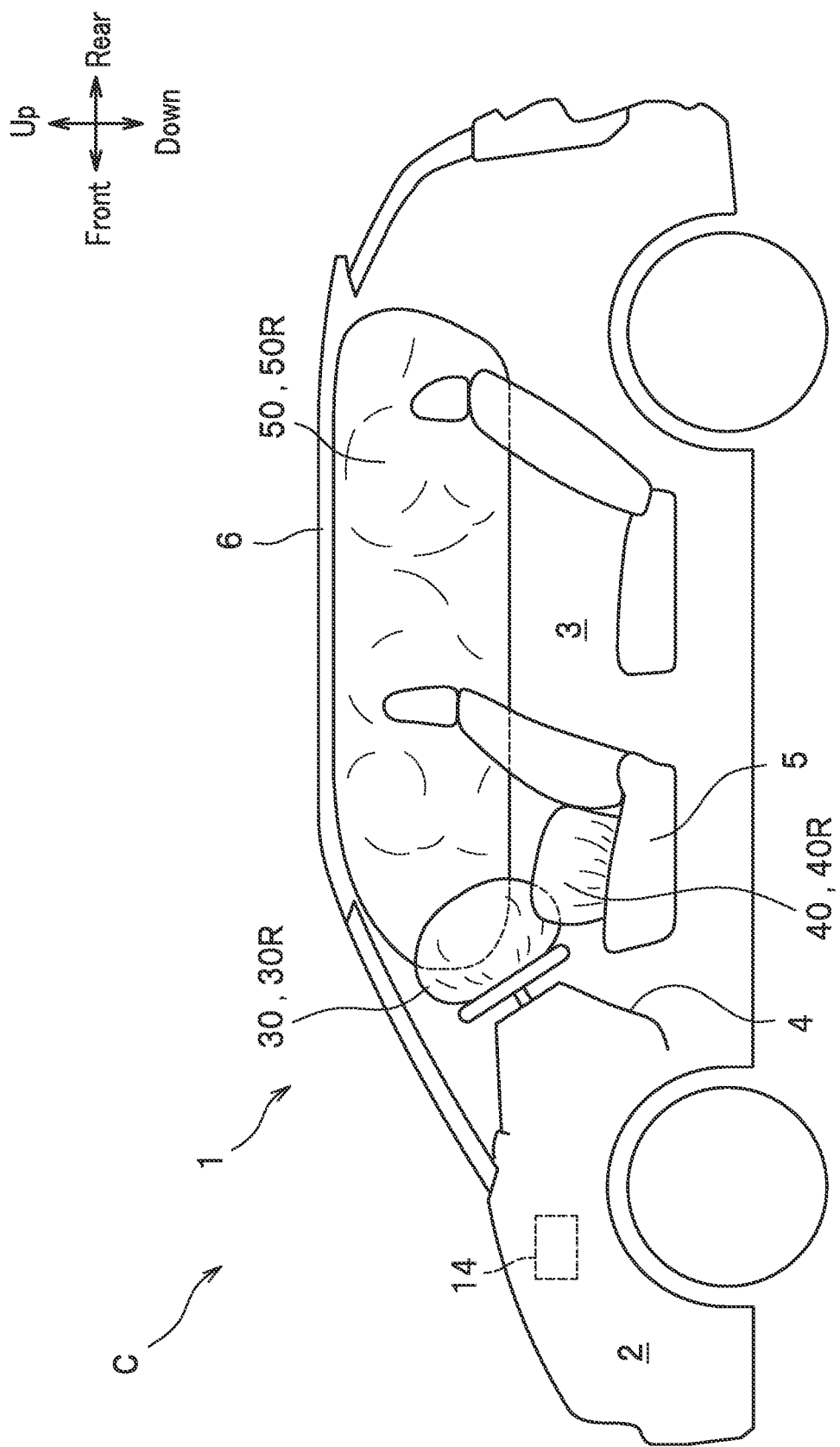
FIG. 1 is a schematic diagram of a vehicle having an occupant protection system according to an embodiment of the present invention.

Next, an embodiment of the present invention is described in detail with reference to drawings as required. Note that a term "front-rear" indicates a front-rear direction along which a vehicle travels, a term "right-left" and a term "up-down" indicate a right-left direction (vehicle width direction) as viewed from a driver seat, and an up-down direction, respectively.

As shown in FIGS. 1 and 2, an occupant protection system 1 according to the embodiment of the present invention is a system for an SRS or Supplemental Restraint System to protect an occupant at a time of a frontal collision, a side collision, or a rollover of a vehicle C. The occupant protection system 1 includes an acceleration sensor 11, an acceleration sensor 12, a rollover sensor 13, a battery 14, and a controller 20. Additionally, the occupant protection system 1 includes a pair of right and left frontal-impact airbag devices 30 (30R, 30L), a pair of right and left side-impact airbag devices 40 (40R, 40L), and a pair of right and left rollover airbag devices 50 (50R, 50L).

<Acceleration Sensor (Frontal-impact Detection Sensor)>

The acceleration sensor 11 is a sensor to detect an acceleration in the front-rear direction of the vehicle C, as shown in FIG. 2. In other words, the acceleration sensor 11 is an example of frontal-impact detection sensors to detect a frontal collision of the vehicle C. A result detected by the acceleration sensor 11 is outputted to the controller 20.

<Acceleration Sensor (Side-impact Detection Sensor)>

The acceleration sensor 12 is a sensor to detect an acceleration in a lateral (right-left) direction of the vehicle C. In other words, the acceleration sensor 12 is an example of side-impact detection sensors to detect a side collision of the vehicle C. A result detected by the acceleration sensor 12 is outputted to the controller 20.

<Rollover Sensor (Rollover Detection Sensor)>

The rollover sensor 13 is a sensor to detect an angular velocity about a roll axis (front-rear axis) of the vehicle C. In other words, the rollover sensor 13 is an example of rollover detection sensors to detect a rollover of the vehicle C. A result detected by the rollover sensor 13 is outputted to the controller 20. Note that a rollover detection sensor is not limited to the above-described rollover sensor 13. A rollover detection sensor may be implemented by a combination of an acceleration (gravity) sensor to detect an acceleration in the up-down direction of the vehicle C and a yaw rate sensor to detect a yaw rate of the vehicle C.

<Battery>

The battery 14 is arranged in an engine room 2 of the vehicle C, as a power source for the frontal-impact airbag 30, the side-impact airbag 40, the rollover airbag 50, and devices mounted in the vehicle C.

<Controller>

The controller 20 is an ECU (Electrical Control Unit) to control components of the occupant protection system 1. The controller 20 includes a CPU (Central Processing Unit), a ROM (Read-Only Memory), a RAM (Random Access Memory), and Input/Output circuits. The controller 20 includes a failure examining unit 21, a determining unit 22, and a capacitor 23, as function units of the occupant protection system 1.

The failure examining unit 21 monitors voltage of the battery 14, for example, to examine the battery 14 for any failure and outputs an examination result to the determining unit 22.

The determining unit 22 obtains results detected by the acceleration sensors 11, 12 and the rollover sensors 13, and determines whether or not the vehicle C has had a frontal collision, a side collision, or a rollover, based on the obtained detection results. In particular, the determining unit 22 determines that the vehicle C has had a frontal collision if a result detected by the acceleration sensor 11 is negative and an absolute value of the result is equal to or greater than a threshold. In contrast, the determining unit 22 determines that the vehicle C has had no frontal collision if the result detected by the acceleration sensor 11 is positive and an absolute value of the result is equal to or greater than the threshold—or—an absolute value of the result detected by the acceleration sensor 11 is less than the threshold. In addition, the determining unit 22 determines that the vehicle C has had a side collision if an absolute value of a result detected by the acceleration sensor 12 is equal to or greater than a threshold, while determines that the vehicle C has had no side collision if an absolute value of the result detected by the acceleration sensor 12 is less than the threshold. Note that the determining unit 22 can determine a direction of a side collision, based on whether the result detected by the acceleration sensor 12 is positive or negative. Further, the determining unit 22 determines that the vehicle C has had a rollover if an absolute value of a result detected by the rollover sensor 13 is equal to or greater than a threshold, while determines that the vehicle C has had no rollover if an absolute value of the result detected by the rollover sensor 13 is less than the threshold. Note that the determining unit 22 can determine a direction of a rollover, based on whether the result detected by the rollover sensor 13 is positive or negative.

Furthermore, the determining unit 22 causes at least one of the frontal-impact airbag device 30 (30R, 30L), the side-impact airbag device 40 (40R, 40L), and the rollover airbag device 50 (50R, 50L) to be supplied with power, based on the result of determination, for activating the corresponding airbag devices 30, 40, 50. In the present embodiment, the determining unit 22 boosts power charged in the battery 14 and then supplies the boosted power to the corresponding airbag devices 30, 40, 50 with respect to the result of determination.

<Capacitor>

The capacitor 23 is an example of backup power sources for the occupant protection system 1. The controller 20 uses power charged in the capacitor 23 for operation, if the battery 14 has faded, and supplies the power charged in the capacitor 23 to one or more of the airbag devices 30, 40, 50 to be activated. The capacitor 23 may be pre-charged with power when packed into the controller 20 or charged with power from the battery 14.

<Frontal-impact Airbag Device>

The pair of right and left frontal-impact airbag devices 30 (30R, 30L) are arranged in a vehicle interior 3, to protect one or more occupants from a frontal collision. The pair of right and left frontal-impact airbag devices 30 (30R, 30L) are concealed in an instrument panel 4 (steering wheel or dashboard) at a front of the vehicle interior 3, to deploy between the instrument panel 4 and the one or more occupants at a time of a frontal collision.

The frontal-impact airbag device 30 includes an inflator 31 and an airbag 32, as shown in FIG. 2. The inflator 31 is activated (ignited) with power from the controller 20 to generate gas within the airbag 32 for deploying the airbag 32. The determining unit 22 of the controller 20 controls a switching circuit (not shown) and the like for normally supplying power supplied from the battery 14 to the inflator 31, and for supplying power charged in the capacitor 23 to the inflator 31 if the battery 14 has failed.

<Side-impact Airbag Device>

The pair of right and left side-impact airbag devices 40 (40R, 40L) are arranged in the vehicle interior 3, as shown in FIG. 1, to protect one or more occupants from a side collision. The pair of right and left side-impact airbag devices 40R, 40L are concealed within front seats (driver seat, front passenger seat) 5, to deploy between side panels of the vehicle C and the one or more occupants at a time of a side collision.

The side-impact airbag device 40 includes an inflator 41 and an airbag 42, as shown in FIG. 2. The inflator 41 is activated (ignited) with power from the controller 20 to generate gas within the airbag 42 for deploying the airbag 42. The determining unit 22 of the controller 20 controls a switching circuit (not shown) and the like for normally supplying power supplied from the battery 14 to the inflator 41 and for supplying power charged in the capacitor 23 to the inflator 41 if the battery 14 has failed.

<Rollover Airbag Device>

The pair of right and left rollover airbag devices 50 (50R, 50L) are arranged in the vehicle interior 3, as shown in FIG. 1, to protect one or more occupants from a rollover. The pair of right and left rollover airbag devices 50R, 50L are concealed within upper ends 6 of side panels of the vehicle (roof side rails or interior members to cover the roof side rails), to deploy between side panels of the vehicle and heads of the one or more occupants at a time of a rollover.

The rollover airbag device 50 includes an inflator 51 and an airbag 52, as shown in FIG. 2. The inflator 51 is activated (ignited) with power from the controller 20 to generate gas within the airbag 52 for deploying the airbag 52. The determining unit 22 of the controller 20 controls a switching circuit (not shown) and the like for normally supplying power supplied from the battery 14 to the inflator 51 and for supplying power charged in the capacitor 23 to the inflator 51 if the battery 14 has failed.

Here, a frontal collision and a side collision of the vehicle C are detected by the acceleration sensors 11, 12 relatively promptly and the controller 20 causes the frontal-impact airbag device 30 and side-impact airbag device 40 to deploy relatively promptly. In contrast, a rollover of the vehicle C occurs later than a frontal collision and a side collision, and is detected by the rollover sensor 13 in a time longer than a time for detecting a frontal collision and a side collision. The controller 20 causes the rollover airbag device 50 to deploy after detecting such a rollover. For this reason, a conventional one of the capacitor 23 has been designed to have a large amount of capacitance in order to secure a long backup operation time of the controller 20 for the rollover airbag device 50.

<Exemplary Behavior>

Next, an exemplary behavior of the occupant protection system 1 is described with reference to FIGS. 3 and 4. In the beginning, while the vehicle is normally travelling, the airbag devices 30, 40, 50 are each in an operable condition with power supplied from the battery 14 (ON state).

First, the determining unit 22 determines whether or not a frontal collision and/or a side collision to the vehicle C has/have occurred, based on results detected by the acceleration sensors 11, 12 (step S1). If it is determined in step S1 that one or more collisions have occurred, the determining unit 22 examines the battery 14 for any failure (step S2). If it is examined in step S2 that a failure has occurred, the determining unit 22 supplies power charged in the capacitor 23 to the frontal-impact airbag device 30 and/or side-impact airbag device 40, and the rollover airbag device 50. This causes the airbags 32, 42 of the frontal-impact airbag device 30 and/or side-impact airbag device 40, and the airbag 52 of the rollover airbag device 50 to deploy at the same time, or with a slight time lag, with power charged in the capacitor 23 (step S3).

In contrast, if it is examined in step S2 that the battery 14 has not failed, the determining unit 22 supplies power charged in the battery 14 to the frontal-impact airbag device 30 and/or side-impact airbag device 40. This causes the airbags 32, 42 of the frontal-impact airbag device 30 and/or side-impact airbag device 40 to deploy with power supplied from the battery 14 (step S4).

If it is determined in step S1 that no collisions have occurred, the determining unit 22 examines the battery 14 for any failure (step S5). After executing step S4 or if it is examined in step S5 that the battery 14 has not failed, the determining unit 22 determines whether or not a rollover of the vehicle C has occurred, based on a result detected by the rollover sensor 13 (step S6). If it has been examined in step S6 that a rollover has occurred, the determining unit 22 causes power charged in the battery 14 to be supplied to the rollover airbag device 50. This causes the airbag 52 of the rollover airbag device 50 to deploy with power supplied from the battery 14 (step S7).

Note that the processing ends if it is determined in step S6 that no rollovers have occurred. In addition, if it is examined in step S5 that the battery 14 has failed, the processing ends. This is because plenty of time has elapsed in this case since the battery 14 failed so that power charged in the capacitor 23 has been consumed and is considered not enough to operate the controller 20.

If the vehicle C has had a frontal collision and/or a side collision at time $t_1$ and the battery 14 has not failed, as shown in FIG. 4, the battery 14 continues to supply power to the airbag devices 30, 40, 50. Then, if the vehicle C has begun to rollover at time $t_2$, the controller 20 deploys the airbag 52 at time $t_3$ after a predetermined time has elapsed since time $t_2$. The rollover airbag device 50 can protect a head of an occupant between $t_3$ and $t_4$.

In contrast, if the vehicle C has had a frontal collision and/or a side collision at time $t_1$ and the battery 14 has failed, as shown in FIG. 5, the battery 14 stops supplying power to the controller 20. The controller 20 is in a backup operation mode between $t_1$ and $t_3$, with power charged in the capacitor 23.

Here, in a conventional case, a capacitor corresponding to the capacitor 23 has been designed to secure a backup operation time of the controller 20 until the rollover airbag device 50 is activated (time $t_3$) in accordance with a commonly-used timing at which a rollover has occurred (titre $t_2$), In contrast to this case, the occupant protection system 1 goes without rollover determination if the vehicle C has had a frontal collision and/or a side collision and the battery 14 has failed, and activates the rollover airbag device 50 at a timing earlier than that in a case of determining a rollover (before time t3). Alternatively, the occupant protection system 1 goes without rollover determination if the vehicle C has had a frontal collision and/or a side collision and the battery 14 has failed, and preferably activates the rollover airbag device 50 at the same time as the frontal-impact airbag device 30 and side-impact airbag device 40 (between time $t_1$ and $t_2$). This configuration allows the capacitor 23 to be reduced in capacitance so that the component in question is reduced in size and cost.

In the cases shown in FIGS. 4 and 5, the latest timing of activating the airbag devices 30, 40, 50 is set to $t_2$, that is, a commonly-used timing at which a rollover has occurred, but is not limited thereto.

The occupant protection system 1 according to the embodiment of the present invention includes: the rollover airbag device 50 provided in the vehicle interior 3; the battery 14 configured to supply power to the rollover airbag device 50; the controller 20 configured to determine a rollover of the vehicle C and, if a rollover of the vehicle C is determined, activate the rollover airbag device 50 using power supplied from the battery 14; and the backup power source (capacitor 23) configured to charge power to be used if the battery 14 fails, wherein the controller 20 determines a collision of the vehicle C and examines the battery 14 for any failure and, if a collision of the vehicle C is determined and the battery 14 is examined to have a failure, activates the rollover airbag device 50 using the power charged in the backup power source. Accordingly, if the battery 14 has failed, the occupant protection system 1 activates the rollover airbag device 50 without rollover determination, to allow the backup power source to be reduced in capacitance so that the component in question, that is, the backup power source is reduced in size and cost.

In addition, if a collision of the vehicle C is determined and the battery 14 is examined to have a failure, the controller 20 of the occupant protection system 1 activates the rollover airbag device 50 at a timing earlier than that in a case where it is determined that the vehicle C has had a rollover. Accordingly, if the battery 14 has failed, the occupant protection system 1 activates the rollover airbag device 50 at a timing earlier than that in a case of determining a rollover when the battery 14 has no failure, to allow the backup power source to be reduced in capacitance so that the component in question, that is, the backup power source is reduced in size and cost.

Further, the occupant protection system 1 includes the frontal-impact airbag device 30 and side-impact airbag device 40, which are arranged in the vehicle interior 3, and the controller 20 activates the frontal-impact airbag device 30 and/or side-impact airbag device 40 using power supplied from the battery 14, if a collision of the vehicle C is determined, and activates the rollover airbag device 50 at the same time as the frontal-impact airbag device 30 and/or side-impact airbag device 40 using power charged in the backup power source, if a collision of the vehicle C is determined and the battery 14 is examined to have a failure. According to this configuration, the occupant protection system 1 activates the frontal-impact airbag device 30 and/or side-impact airbag device 40, and the rollover airbag device 50 without rollover determination, if the battery 14 has failed. The occupant protection system 1 thus activates the rollover airbag device 50 at a timing earlier than that in a case of using a conventional system (at the same time as the frontal-impact airbag device 30 and/or side-impact airbag device 40, or with a slight time lag, for example), to allow the backup power source to be reduced in capacitance so that the component in question, that is, the backup power source is reduced in size and cost.

Hereinabove, the embodiment of the present invention has been described, but the present invention is not limited thereto and can be modified within the scope of the present invention. For example, the backup power source is not limited to the capacitor 23 packed in the controller 20. In addition, the rollover airbag device 50 may be a rollover and side-impact airbag device. With this configuration, the controller 20 of the occupant protection system 1 activates the rollover airbag device 50 as a side-impact airbag device in step S4 if it is determined in step S1 that a side collision has occurred. In this case, the processing flow goes without steps S6 and S7 after step S4 has been processed.

LIST OF REFERENCE SIGNS

1: occupant protection system, 14: battery, 20: controller, 23: capacitor (backup power source), 30, 30R, 30L: frontal-impact airbag device, 40, 40R, 40L: side-impact airbag device, and 50, 50R, 50L: rollover airbag device.

What is claimed is:

1. An occupant protection system, comprising:
   a rollover airbag device provided in a vehicle interior;
   a battery configured to supply power to the rollover airbag device;
   a controller configured to determine a rollover of a vehicle and, if a rollover of the vehicle is determined, activate the rollover airbag device using power supplied from the battery; and
   a backup power source configured to charge power to be used if the battery fails,
   wherein the controller determines a collision of the vehicle and examines the battery for any failure and, if a collision of the vehicle is determined and the battery is examined to have a failure, proceeds without rollover determination and activates the rollover airbag device using the power charged in the backup power source at a timing earlier than that in a case of determining the rollover.

2. The occupant protection system as claimed in claim 1, further comprising:
   a frontal-impact airbag device and a side-impact airbag device, which are arranged in the vehicle interior,
   wherein the controller
      activates the frontal-impact airbag device and/or side-impact airbag device using power supplied from the battery, if a collision of the vehicle is determined, and
      activates the rollover airbag device as well as the frontal-impact airbag device and/or side-impact airbag device using power charged in the backup power source, if a collision of the vehicle is determined and the battery is examined to have a failure.

* * * * *